2,558,037

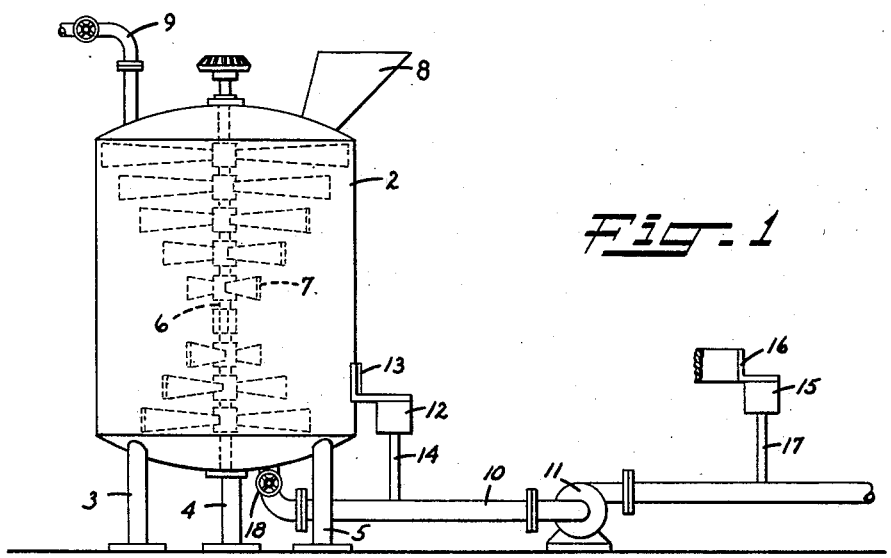
Fig. 1
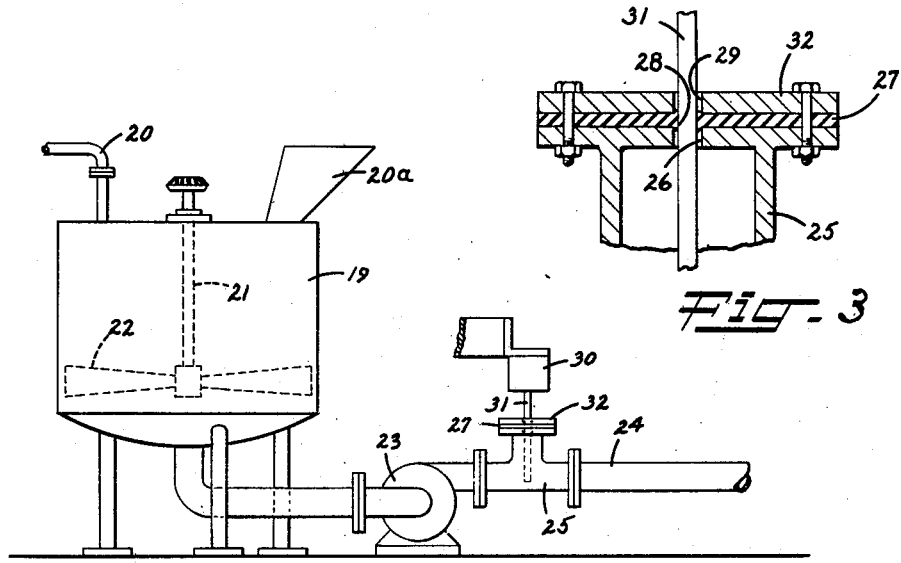
Fig. 2
Fig. 3
INVENTORS.
JOHN ALFRED CALHOUN Jr.
FREDERICK C. WEDLER Patented June 26, 1951

UNITED STATES PATENT OFFICE 2,558,037

VISCOSE PRODUCTION

John Alfred Calhoun, Jr., and Frederick C. Wedler, Swarthmore, Pa., assignors to American Viscose Corporation, Wilmington, Del., a corporation of Delaware Application August 21, 1946, Serial No. 692,119

2 Claims. (Cl. 260—217)

This invention relates to an improved process for dissolving solids in a liquid medium or vehicle, and particularly to the production of smooth solutions or sols from solids and liquids in which the solids, in particulate form, normally tend to form discrete gels or agglomerates which resist solvation under ordinary conditions of mixing.

While the invention is of general application to the production of smooth solutions of solid particulate materials adapted to be formed into shaped articles such as filaments and films in liquids in which the solid particles normally tend to form gels, it is particularly advantageous in connection with the production of viscose.

Viscose is obtained by agitating cellulose xanthate crumbs, produced by the action of carbon disulfide on crumbs of alkali cellulose, with a solvent, such as water or caustic soda solution, for example, until a thick viscous solution (viscose) is obtained, the viscose being then stored for a time to permit ripening or "ageing" thereof. During the storage period, the viscose undergoes an initial drop in viscosity, the viscosity decreasing progressively until it reaches a minimum low point, after which it again rises, eventually extremely rapidly, following a curve the exact shape of which is dependent upon several factors including cellulose and alkali concentrations, temperature, etc.

The initial drop in viscosity during storage for ripening apparently results from the fact that xanthation, which takes place largely at the surface of the alkali cellulose crumbs, proceeds to completion with redistribution of the xanthate groups until, at the lowest point in the viscosity curve, the groups are in equilibrium. At that point, hydrolytic changes set in with gradual breaking away of the xanthate groups and conversion thereof into sulfur-containing by-products. As the cellulose xanthate gradually loses its xanthate groups, it becomes progressively more insoluble. The degree of solubility of the product may be measured by determining the concentration of a salt, such as sodium chloride or ammonium chloride, which will cause precipitation or gelation of the viscose, i. e., by determining the salt point of the viscose. The dexanthation is allowed to progress until the salt point, measured as described above, drops to a value at which, based upon experience, the viscose is in an optimum condition of spinnability for a given set of spinning conditions. The time during which the viscose is stored for ripening is variable, depending upon the particular composition of the viscose being handled and other factors, and may be from about 75 to 100 hours, or it may be of longer duration as for example four or five days.

In accordance with conventional procedures, the cellulose xanthate crumbs and solvent are introduced, in the appropriate proportions to produce a viscose of the desired ultimate viscosity, into a mixing vessel equipped with suitable agitating devices, and subjected to strong agitation and mixing for several hours. Because penetration of the solvent into the crumbs and distribution of the solvent to all of the crumbs and to all portions of each individual crumb are greatly impeded by the tendency of the viscid sticky crumbs of cellulose xanthate to agglomerate into lumps or gel-like bodies which resist complete solvation even under conditions of strong agitation, considerable time is required to produce each batch of viscose and the viscose is not completely homogeneous or free from undissolved cellulose xanthate. Frequently, small crumbs or agglomerates persist in the viscose and their presence complicates the later filtration and spinning operations. These difficulties are not entirely overcome by passing the xanthate crumbs through a grinding device, such as an attrition mill or disintegrator, because in that case, also, because of the stickiness of the crumbs, undissolved or only partially dissolved agglomerates persist in the viscose even after agitation of the xanthate with the solvent for an hour or more. The overall time required for the production of a viscose which may be filtered and spun with a minimum of trouble is considerable, and of course existing apparatus is tied up for quite a long time with each batch being produced.

One object of this invention is to produce a smoother, more homogeneous viscose. Another object is to accelerate the ripening of viscose to the predetermined optimum condition of spinnability. A further object is to provide a method for the production of the more homogeneous viscose on a continuous scale.

These and other objects of the invention are accomplished by subjecting a mass comprising at least some undissolved or only partially dissolved cellulose xanthate crumbs and a solvent therefor, in sufficient amounts to produce a viscose of the desired ultimate viscosity, to high frequency longitudinal or compressional waves, herein called high frequency sound waves, that is, sound waves having a frequency in the upper sonic and ultrasonic frequency ranges, say frequences of from at least about 1,000 to a million or more cycles per second. Further, it is within the scope of this invention to subject the mass comprising the undissolved cellulose xanthate simultaneously or successively to the radiations of sound waves having different frequencies within the ranges stated, and of different magnitudes.

The mass subjected to the sound wave radiations in accordance with the invention may be a viscose containing some undissolved cellulose xanthate and obtained by agitating cellulose xanthate crumbs and the solvent in a conventional type mixing or dissolving tank for a comparatively short time, usually less than half the agitating period for the viscose-forming components under conventional viscose manufacturing conditions, or it may be a slurry obtained by merely stirring the cellulose xanthate and solvent together without subjecting the same to sufficient agitation to effect any substantial solvation of the cellulose xanthate crumbs. Thus, in accordance with the invention, the cellulose xanthate crumbs, with or without grinding thereof, may be introduced, together with the solvent, in appropriate proportions, into a mixing vessel equipped with the usual type agitating means, strongly agitated for a relatively brief period of time to produce a viscose having some undissolved cellulose xanthate suspended therein, or merely stirred together to form a slurry and the mass may then be subjected to the high frequency sound wave vibrations, either in the mixture, or after withdrawal therefrom. One method of practicing the invention, is to withdraw the agitated mixture from the mixing apparatus and continuously pass it through a field of high frequency sound waves, or through a plurality of such fields in succession, the mass being exposed to the sound wave radiations until the cellulose xanthate is dissolved and a smooth solution of the desired viscosity is obtained. As an alternative mode of procedure, the crumbs and solvent may be continuously introduced, in regulated amounts, into a mixer equipped with a simple stirring device to effect mixing of the crumbs and solvent to form a slurry, and the slurry may then be continuously passed through a field of high frequency sound waves to form a completely homogeneous viscose substantially free from undissolved cellulose xanthate. The last mentioned embodiment of the invention has the particular advantage of adaptability to performance on a continuous scale, thus avoiding costly interruptions for discharging the batch, cleaning the mixer, and refilling it with another batch. In either case, the over-all time required for the production of the viscose is reduced to a fraction of that ordinarily required. The sound wave radiations may be applied either directly or indirectly to the mass comprising the cellulose xanthate crumbs and solvent.

The sound waves may be generated by any suitable sound generating device, such as a piezoelectric sound generator, a magnetostriction sound generator, an electromagnetic sound generator, etc.

The accompanying drawing is illustrative of apparatus suitable for carrying out the method of the invention. In the drawing, Figure 1 is an elevation view of apparatus suitable for carrying out one modification of the invention;

Figure 2 is an elevation view of apparatus for carrying out another modification of the invention; and Figure 3 is an enlarged view of a portion of the apparatus shown in Figure 2.

Referring to Figure 1, the numeral 2 represents a mixing and dissolving tank supported on pedestals 3, 4, and 5, and equipped with a rotor comprising a shaft 6 carrying spaced blades 7, and driven by any suitable means, not shown. Cellulose xanthate crumbs are introduced into the tank through chute 8, and the solvent, such as an aqueous sodium hydroxide solution, is metered in through pipe 9. A circulating pipe system 10 is connected with the mixer, and has associated therewith a pump 11 for withdrawing the viscose formed in the tank. The pipe is preferably made of a thin highly resilient metal capable of transmitting high frequency vibrations, such as steel. A sound generator 12 is supported in a bracket 13 secured to the side of tank 2, and has associated therewith a transmission tube 14 which rests upon the external wall of pipe 10. Another sound generator 15 is secured in a bracket 16 supported by means not shown, and has associated therewith a transmission tube 17 which also rests upon the external wall of the pipe beyond the pump 11. In operation, cellulose xanthate crumbs and the solvent are introduced into the tank, the rotor is set in operation, and the viscose forming components are subjected to the agitating and mixing action of blades 7 until a mass is obtained in which a major proportion of the cellulose xanthate has been dissolved but which still contains some suspended undissolved cellulose xanthate, and which may be termed a crude viscose. Under average conditions of agitation, and depending upon the speed at which the rotor is driven, etc., the crude viscose may be obtained in a relatively short time. At the end of the predetermined agitating period, valve 18 is opened pump 11 is set in operation, and the viscose is pumped through the circulating pipe system. As the viscose passes through the pipe, it is subjected to the sound wave radiations transmitted to the wall of the pipe by transmission tubes 14 and 17.

Figure 2 illustrates apparatus which may be used for the continuous production of viscose in accordance with the invention. There, the cellulose xanthate crumbs and solvent are continuously introduced into the mixing tank 19 through pipe 20 and chute 20a, respectively. The tank is equipped with a shaft 21 carrying a blade 22, the shaft being driven at the desired speed by means not shown. In the tank, the solvent and crumbs are thoroughly mixed to form a slurry, which is continuously withdrawn from the tank, by the action of pump 23. The slurry is pumped through conduit 24, preferably formed of a thin highly resilient metal such as steel, and provided with a T connection 25, the upper flange of which is provided with a central bore 26 and seats a gasket 27 of resilient material such as rubber, having a bore 28 centrally disposed thereof, over which is bolted a metallic cap 32 having a central bore 29 the diameter of which is somewhat greater than the diameter of the bore in gasket 27. Mounted above the T connection 25 (by means not shown) is a sound generator 30 having an associated transmission tube 31 which extends through the concentric bores 26, 28 and 29 in the flange of the T connection, the gasket, and the metallic cap respectively, and projects into the interior of the T 25 (see Figure 3). As the slurry passes through the conduit it is directly subjected to the high frequency sound wave radiations, which are thus applied locally to each succeeding portion of the slurry. Under the influence of the sound wave radiations, the undissolved or only partially dissolved cellulose xanthate present therein is dissolved to produce a homogeneous viscose. The viscose may be passed through a plurality of sound wave fields, in which it is subjected to further local irradiation, if desired.

Under the influence of the high frequency sound wave radiations and the disruptive stresses to which the crumbs are subjected by the violent collapse of the cavities produced by the sound waves, any crumbs or agglomerates present in the crude viscose or slurry of cellulose xanthate in aqueous sodium hydroxide solution are dispersed, and brought into more intimate contact with the solvent, with consequent uniformity of distribution of the solvent to all of the crumbs and to all portions of each of the individual crumbs, and greatly accelerated penetration of the solvent into and through the crumbs. The crumbs are thus rapidly dissolved to form a smooth solution.

The cellulose xanthate crumbs may be passed through an attrition mill or the like, if desired, prior to being introduced into the mixing tank but usually such precautions are not necessary since even if the crumbs are usually large or agglomerated into sizeable masses, they are disrupted, dispersed, and rapidly dissolved under the action of the sound wave radiations.

Viscoses prepared with the aid of high frequency sound wave radiations, in accordance with the invention, have a lower viscosity than viscoses produced by usual methods wherein batches comprising the crumbs and solvent are subjected to prolonged agitation by agitating devices of conventional type and such agitation is entirely depended upon to effect solvation of the crumbs and produce a viscose which, after ageing or ripening and filtration, is suitable for spinning. Usually, the viscosity of the viscose leaving the zone of the high frequency sound wave radiations is equivalent to or approximates that of a viscose which has been stored for ripening and which has undergone an initial decrease in viscosity during the earlier stages of the storage period. That is, the viscosity of the viscose leaving the high frequency sound wave filed is at or near the minimum low point which the viscosity reaches during the normal storage period, and before it again tends to rise, indicating that, under the influence of the sound wave radiations, a redistribution of such groups has taken place, in the same manner as apparently occurs when viscose produced by ordinary agitating methods is stored for "ageing."

The storage time for "ageing" the viscose is thus more or less confined to that period required for dexanthation to take place to the extent that the salt point drops to the pre-selected value at which the viscose is to be spun. The greater uniformity of redistribution of the xanthate groups effected by the sound wave radiations, and consequent greater uniformity of dexanthation during the shortened "ageing" period have an important influence on the quality of the final viscose and products formed therefrom.

The comparatively short time required for dissolving the crumbs, coupled with reduction in the time required for "ageing" the viscose, represents an appreciable saving in the overall time required for preparing the viscose and spinning it into filaments or otherwise shaping it into useful articles.

The time of exposure of the viscose or slurry of cellulose xanthate and aqueous sodium hydroxide may be varied somewhat, but in any case, the solution is removed from the high frequency sound wave field while it is of low viscosity, so that the ripening period is not hastened to the extent that the viscose is thrown into a stage of ripening outside the range of spinnability under the spinning conditions to be employed.

The invention may also be practiced in connection with the production of smooth solutions of particulate cellulose acetate in acetone or the like or solutions of particulate resinous materials in solvents therefor as, for instance, in the preparation of varnishes, lacquers, etc., solutions of starch or similar potentially gel-forming materials in aqueous or other media, and in fact for the production of smooth solutions or sols of all particulate solid materials which tend to form gels in the liquid medium.

It will be understood that variations and modifications may be made in carrying out the process of the invention without departing from the spirit and scope thereof, and the invention is not to be limited except as defined in the appended claims.

We claim:

1. In the production of viscose, the method of ageing the viscose to the viscosity at which it is to be formed into shaped articles which comprises subjecting a mass comprising at least some undissolved cellulose xanthate and aqueous sodium hydroxide to high frequency sound waves having a frequency of at least 1000 cycles per second until a smooth, substantially homogeneous viscose having a viscosity approximating the minimum low point which the viscosity of viscose reaches during normal storage thereof for ageing and before it again tends to rise, and then storing the viscose without subjecting it to agitation until the viscosity has risen to that viscosity at which the viscose is to be formed into shaped articles.

2. A method as in claim 1, wherein the mass comprising at least some undissolved cellulose xanthate and aqueous sodium hydroxide is continuously circulated in a confined path and subjected during such circulation to the high frequency sound waves, said waves being applied locally and directly to each succeeding portion of the circulating mass.

JOHN ALFRED CALHOUN, JR.
FREDERICK C. WEDLER.

REFERENCES CITED

The following references are of record in the file of this patent:

UNITED STATES PATENTS

| Number | Name | Date |
|---|---|---|
| 1,738,565 | Claypoole | Dec. 10, 1929 |
| 2,138,051 | Williams | Nov. 29, 1938 |
| 2,296,378 | Bartunek | Sept. 22, 1942 |
| 2,306,107 | Henderson | Dec. 22, 1942 |

FOREIGN PATENTS

| Number | Country | Date |
|---|---|---|
| 332,533 | Great Britain | July 16, 1930 |
| 604,864 | Great Britain | July 12, 1948 |
| 423,382 | Canada | Oct. 24, 1944 |

OTHER REFERENCES

Freundlich "Industrial Applications of Supersonic Vibrations," Transactions, Institutions of Chemical Engineers, vol. 15 (1937), page 225.

Freundlich et al. "Kolloidchem Beih.," vol. 37, 1933, page 223.

Sollner, Chemical Reviews," vol. 34, pages 379–80, June 1944.